United States Patent [19]
Johnson

[11] 3,908,908
[45] Sept. 30, 1975

[54] GIMBALED NOZZLE FOR ROCKETS

[75] Inventor: Wendell O. Johnson, Brigham City, Utah

[73] Assignee: Thiokol Corporation, Bristol, Pa.

[22] Filed: June 5, 1970

[21] Appl. No.: 43,739

[52] U.S. Cl. .......................................... 239/265.35
[51] Int. Cl. ............................................. B64c 15/04
[58] Field of Search..... 239/265.11, 265.19, 265.35; 60/232; 92/255

[56] References Cited
UNITED STATES PATENTS

| | | | |
|---|---|---|---|
| 3,050,938 | 8/1962 | Twyford | 239/265.35 |
| 3,136,250 | 6/1964 | Humphrey | 60/232 |
| 3,140,584 | 7/1964 | Ritchey et al. | 239/265.35 |
| 3,237,890 | 3/1966 | Thielman | 239/265.35 |

*Primary Examiner*—Samuel Feinberg
*Attorney, Agent, or Firm*—Stanley A. Marcus; Edward E. McCullough

[57] ABSTRACT

A compact, gimbaled, de Laval nozzle for rockets wherein actuators are built into the gimbal ring so that a first actuator may move the de Laval nozzle relative to the gimbal ring and a second actuator, circumferentially spaced at right angles to the first, may move the gimbal ring relative to a blast tube.

3 Claims, 4 Drawing Figures

INVENTOR.
WENDELL O. JOHNSON
BY
Edward E. McCullough

INVENTOR.
WENDELL O. JOHNSON
BY
Edward E. McCullough 3,908,908

GIMBALED NOZZLE FOR ROCKETS

BACKGROUND OF THE INVENTION

The present invention relates broadly to thrust vector control nozzles for rockets; and, particularly, to gimbaled nozzles having compactly-arranged actuators.

Gimbaled thrust nozzles for rockets have been found useful in applications requiring that the nozzle be capable of movement through a wide arc for rapid maneuverability. However, the weight and bulk of the gimbal ring, in addition to that of the actuators for directing the nozzle, has always been a disadvantage in the use of such nozzles. This is especially true of the types of rockets wherein the gimbaled nozzle would be most advantageous—those requiring very high accelerations in the atmosphere. Any protuberance extending beyond the cross sectional envelope of the rocket tends to create high aerodynamic torques or drags. Also, such protuberances prevent the use of existing launching tubes, e.g., those with which military aircraft are commonly equipped. The conventional gimbaled nozzle is swung laterally for steering the rocket by two double-acting, hydraulic actuators, circumferentially spaced at right angles to one another; one is attached at one end to the exit cone of the nozzle and at the other end to the gimbal ring, and the other is attached at one end to the gimbal ring and at the other end to an adapter ring by which the nozzle is attached to the rocket. When the diameter of the rocket, the size and shape of the nozzle, and the size of the actuators are all optimized for certain applications, it has been found virtually impossible to design the conventional gimbaled nozzle in such a way that protuberances extending beyond the cross-sectional envelope of the rocket are eliminated when the nozzle is moved to its maximum angle to the axis of the rocket. Even though each actuator operated in only one plane, practical considerations made it desirable that they be attached at both ends by universal joints. These tended not only to be bulky and heavy, but each actuator itself tended to swing through a considerable arc; and, in doing so, to protrude beyond the cross-sectional envelope of the rocket.

SUMMARY OF THE INVENTION

The present invention, which overcomes these disadvantages of conventional gimbaled nozzles, is essentially a gimbaled nozzle wherein at least some of the actuators are built into the gimbal ring, others optionally being fixed to it; and the conventional universal joint by which the actuators were attached being replaced at one end by a hinge joint and at the other by a special bearing joint.

Objects of the invention are to provide a rocket nozzle that can be more compactly designed to fit into an envelope of restricted dimensions, even when in operation, and to provide such a nozzle that will save the weight of actuator bodies. Important features of the invention are that the de Laval portion of the nozzle may be quickly swung through a wide arc for rapid maneuverability of a rocket, that it is relatively simple in construction and trouble-free in operation, and that mechanical play between connecting parts of the conventional gimbaled nozzle is eliminated to a large extent, to provide a faster, more positive action. Another important feature of the invention is that, because all of the actuators are in fixed relationship to the gimbal ring, most of the hydraulic lines may be either incorporated into the gimbal ring or mounted thereon. Hence, only a small portion of the hydraulic line needs to be flexible and subject to wear.

Other objects and advantages of the invention will be noted as the following detailed description is read with reference to the accompanying drawings, wherein the same parts are designated by identical characters throughout the disclosure.

DESCRIPTION OF THE PREFERRED EMBODIMENTS

Figure 1:
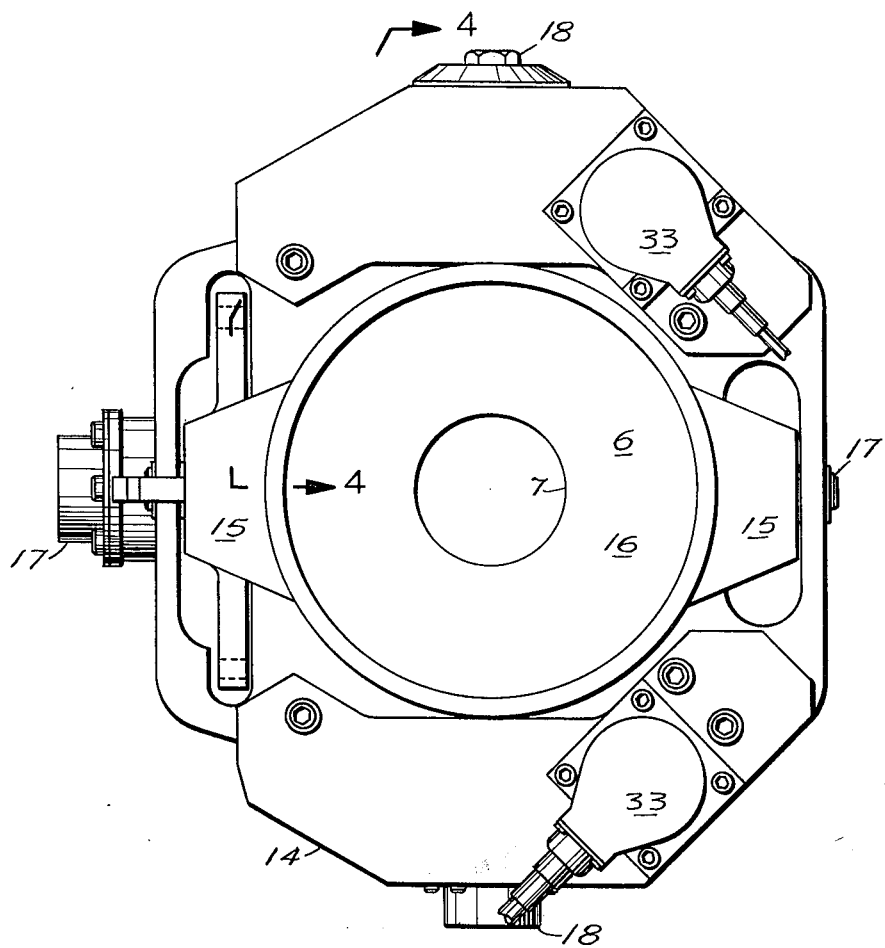
FIG. 1 is an end view of the invention.
Figure 2:
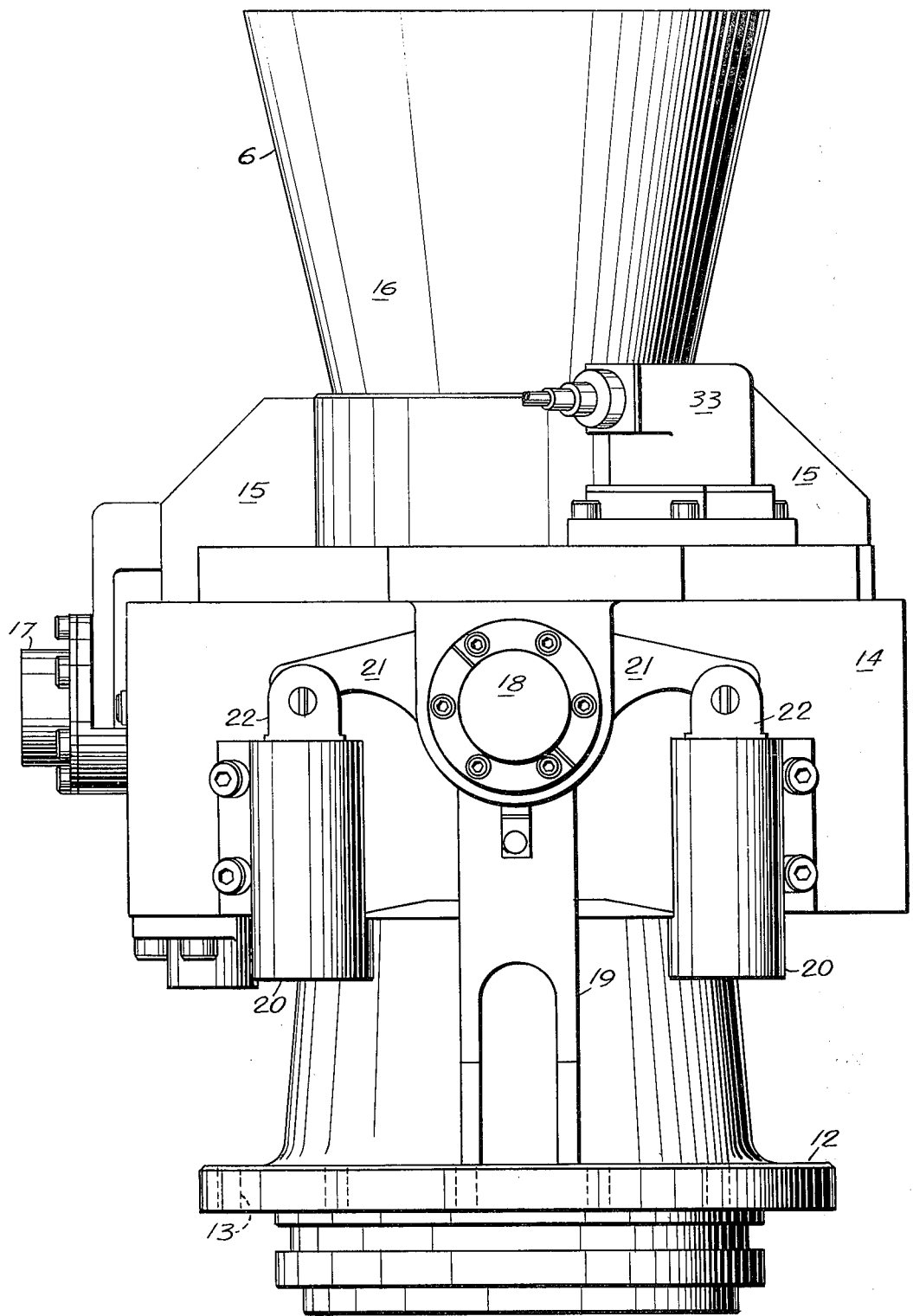
FIG. 2 is a side elevation of the invention.
Figure 3:
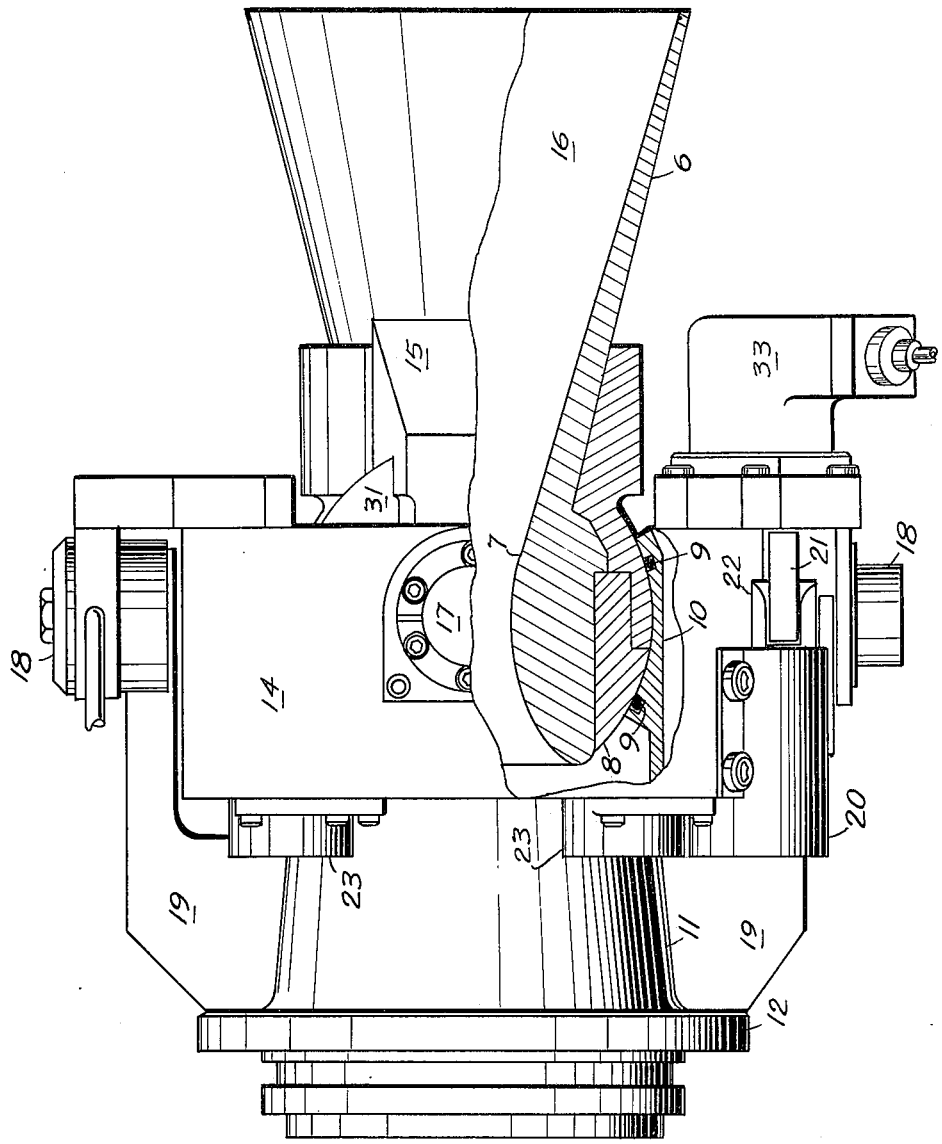
FIG. 3 is a side elevation, with the invention rotated 90° relative to FIG. 2, and with some parts broken away to show internal parts.

In the preferred embodiment of the invention shown, the de Laval nozzle 6 has a throat section 7 that has a spherical exterior 8. An O-ring 9 insures a gas-tight seal between the throat section 7 and the spherical surface of the outer portion 10 of a short blast tube 11. The blast tube 11 may be fastened over an opening in a rocket case by an adapter ring 12 that is equipped with holes 13 for screws. A gimbal ring 14, concentric with the nozzle 6, is fixed thereto by diametrically-opposed brackets 15. The brackets 15, that are fixed to the exit cone 16 of the de Laval nozzle 6, are hinged to the gimbal ring 14 by diametrically-opposed axis pins 17. The gimbal ring 14, in turn, is hinged to the blast tube 11 by a second pair of diametrically-opposed pins 18, whereby it engages a pair of brackets 19 that are fixed to the blast tube 11. A pair of single-action hydraulic actuators 20 are fixed to the gimbal ring 14 and bear against two arms 21 that extend from one of the brackets 19 in integral relationship therewith, the piston rods 22 being pivotally attached to the arms 21. A special universal joint, that will be described presently, enables a piston in each actuator to bear against each piston rod 22 while each actuator body remains fixed to the gimbal ring 14. The gimbal ring 14 and the nozzle 6 may be rotated as desired in the plane about the pins 18 by selected, differential pressures in the actuators 20.

Figure 4:
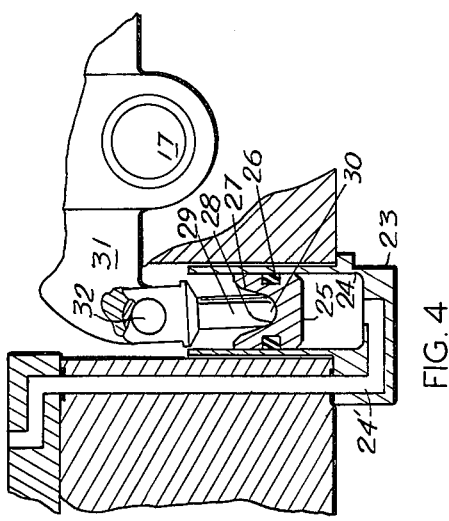
FIG. 4 is a sectional view of an actuator, taken on line 4—4 of FIG. 3.

A second pair of actuators 23, built into the gimbal ring 14, bear against the nozzle exit cone 16 to rotate the nozzle 6 relative to the gimbal ring 14. As detailed in FIG. 4, the actuators 23 typically are made in a closed-end bore 24 in the gimbal ring. A piston 25 having a seal 26 about its periphery is seated in the bore 24 for longitudinal movement therein. The piston 25 has a recess 27 having a spherical central portion 28 in its outer surface, in which a short piston rod 29, having a spherical end 30, is seated. Each piston rod 29 bears against one of a pair of diametrically opposed brackets 31 fixed to the exit cone 16, the piston rod 29 in each case being hinged to the bracket 31 by a pivot pin 32. A duct 24' conveys hydraulic fluid into the closed end of the bore 24. Different relative pressures in the actuators 23 cause the nozzle 6 to rotate relative to the gimbal ring 14 in the plane about the axis pins 17, whereby the de Laval nozzle 6 is hinged within the gimbal ring 14. Except for the fact that they are not built into the gimbal ring 14, the actuators 20 are identical in construction to actuators 23.

A pair of servovalves 33 regulate the hydraulic fluid that pressurizes the actuators 20 and 23, one servovalve 33 being in a closed system with each pair of actuators. The servovalves, not shown in detail, are very well known in the art and are commercially available. They consist essentially of an electromagnetically-operated needle valve that functions somewhat as a fluidic amplifier to position the spool of a spool valve relative to orifices through which the main stream of hydraulic fluid flows. The spool valve in turn proportions the pressurized main stream of hydraulic fluid flowing therethrough to each member of a pair of opposed actuators 20 or 23. Although these actuators, in the embodiment described, are single acting, they could be double acting as well.

In operation, an electric signal generated by a guidance system, not a part of the invention, regulates each servovalve 33 to cause the appropriate amount of hydraulic fluid to pressurize each member of each pair, 20 and 23, of actuators to cant the de Laval nozzle 6 in the desired direction. Although each pair of actuators 20 and 23 is capable of rotating the nozzle 6 in only one plane about an axis pin 17 or 18, it can easily be seen that, since these planes are mutually perpendicular, the combined actions of the actuators 20 and 23 can quickly move the nozzle 6 into any position within an imaginary cone defined by the limits of the mechanism.

An important feature of the invention is that both actuators of a given pair, 20 or 23, are pressurized in the same direction relative to members they bear against. This eliminates mechanical play between parts, to provide a quick response without the need for excessively close, expensive tolerances. Another important feature is that the actuator bodies are all stationery relative to the gimbal ring 14; and, hence, never protrude beyond the confines established thereby.

Although the preferred embodiment of the invention described has only one pair of actuators, 23, built into the gimbal ring 14, with the actuators 20 being attached to the exterior of the gimbal ring; it is readily apparent that both pairs of actuators 20 and 23 could be built into the gimbal ring 14.

An invention has been described that constitutes an advance in the art of rocket technology; and, although a preferred embodiment has been described with considerable specificity with regard to detail, it should be noted that equivalent means may be substituted in many cases without departing from the scope of the invention as it is defined in the following claims.

The invention claimed is:

1. In a gimbaled thrust nozzle for rockets, having a de Laval nozzle, a gimbal ring surrounding and pivotally attached to the de Laval nozzle, and a blast tube, attachable to a rocket, surrounding the de Laval nozzle and pivotally attached to the gimbal ring at right angles to its attachment to the de Laval nozzle, the improvement comprising:

a first pair of single-acting, hydraulic cylinders fixed to the gimbal ring and circumferentially spaced at right angles to the pivotal attachment of the gimbal ring to the de Laval nozzle and operatively attached to the exit cone thereof, and a second pair of single-acting, hydraulic cylinders fixed to the gimbal ring and circumferentially spaced at right angles to the first and operatively attached at one end to the blast tube.

2. The gimbaled nozzle of claim 1 wherein at least one pair of opposing actuators is built into the gimbal ring.

3. The gimbaled nozzle of claim 1 wherein each member of at least one pair of opposing actuators has a piston with a spherical recess in its outer surface, each piston being seated with a fluid-tight fit in a bore in the gimbal ring for sliding motion therein, each bore having a duct through which fluid may be introduced into the bore; and A piston rod having a spherical surface on one end that is seated in the spherical recess in the piston for bearing thereagainst, the rod being operatively attached at its other end, for pivotal motion, to a member relative to which the gimbal ring may move, in the plane of the actuator.

* * * * *